Jan. 20, 1970   J. G. LEWIS   3,490,820
CAPACITOR CLAMP FOR ELECTRIC MOTOR
Filed Nov. 6, 1967

INVENTOR:
JOHN G. LEWIS
BY
ATTORNEY.

United States Patent Office 3,490,820
Patented Jan. 20, 1970

3,490,820
CAPACITOR CLAMP FOR ELECTRIC MOTOR
John G. Lewis, St. Louis, Mo., assignor to Emerson Electric Co., St. Louis, Mo., a corporation of Missouri
Filed Nov. 6, 1967, Ser. No. 680,748
Int. Cl. H02k 11/00
U.S. Cl. 310—72              4 Claims

ABSTRACT OF THE DISCLOSURE

A biuncinate clamp for holding a capacitor to the inside of an electrical motor end shield. Hooked end sections are joined by a central span section. The hooked end sections engage a circumferential rib on the end shield. Shoulder sections, between the hooked end sections and the central span section, abut the inner faces of radial ribs on the end shield. The central span section defines a flat curled tongue, a tip and flat section of which hold a side of the capacitor against the end shield.

BACKGROUND OF THE INVENTION

This invention relates to a clamp for holding the capacitor of a capacitor start electric motor.

The capacitor of a capacitor start motor is conventionally mounted on the outside of the motor, because the mounting devices known heretofore have made mounting of a capacitor inside the end shield of the motor difficult.

One of the objects of this invention is to provide a capacitor clamp which permits the mounting of a capacitor on the inside face of an end shield of a motor.

Another object is to provide such a capacitor clamp which is compact, economical to manufacture, and easy to install.

Other objects will appear to those skilled in the art in the light of the following description and accompanying drawing.

SUMMARY OF THE INVENTION

In accordance with this invention, generally stated, in a capacitor start electric motor having an end shield and a capacitor with a casing, a clamp is provided formed of stiffly flexible wire stock, which has two end sections adapted to engage the end shield, and a central span section adapted to cradle the casing of the capacitor and to urge the casing of the capacitor into engagement with the interior of the end shield.

In the preferred embodiment, the two end sections are provided with uncinate shoulders adapted to engage the outer face of a circumferential rib on the motor end shield and an inner face of a radial rib.

The terms "axial," "radial" and "circumferential" are used herein in reference to the motor.

Also in the preferred embodiment the central span section includes a curled tongue, the margins of which are defined by a pair of convergent legs. The tongue cradles the radially inner side of the capacitor case, and the tip of the tongue engages the capacitor case and urges it axially outward against a rim on the end shield. In an illustrative embodiment shown, only the tip of the tongue and one point on each tongue defining leg engage the axially inner face of the capacitor case.

DESCRIPTION OF THE PREFERRED EMBODIMENT

Figure 1:
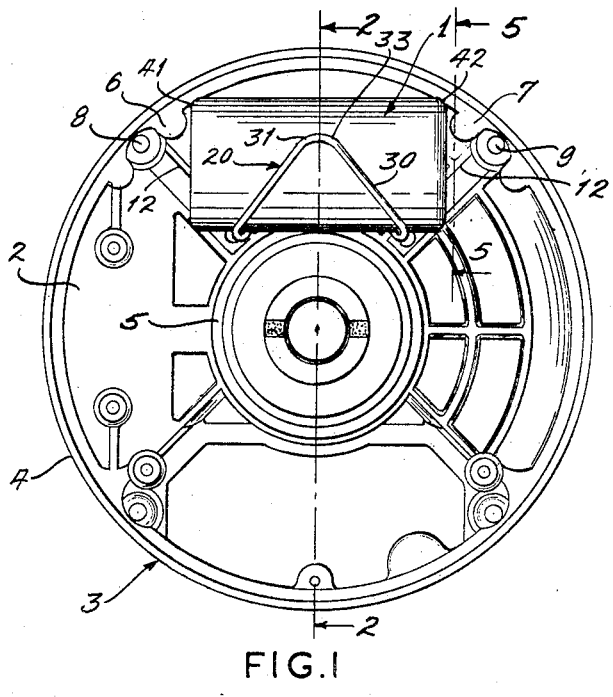
FIGURE 1 is a view in elevation, looking axially outwardly of a motor, showing an end shield upon the inside of which a capacitor is mounted by means of one illustrative embodiment of clamp of this invention.

Referring now to the drawing for one illustrative embodiment of capacitor clamp of this invention, reference numeral 1 indicates a capacitor mounted on an inside surface of an end shield 2 of a capacitor start electric motor. The capacitor 1 is a conventional capacitor with a cylindrical cup-type casing 3. The capacitor 1 is mounted on the end shield 2 radially between an outer rim 4 and a rotor bearing housing 5, and circumferentially between lugs 6 and 7 adjacent through-bolts holes 8 and 9 in the end shield 2. The capacitor 1 is mounted on the end shield 2 by means of a capacitor clamp 20. The clamp 20 consists of a formed length of wire, having two end parts in the form of uncinate end sections 25, spaced from each other by a central span section 30. Hooked ends 27 of shoulders 26 of the end sections engage the outer face of a circumferential rib 11 on the end shield 2 and the shoulders 26 engage the axially inner faces of radial ribs 12 on the end shield 2. For ease of insertion and additional flexibility, the shoulders 26 form somewhat obtuse dog legs with the central span section 30.

The central span section 30 comprises a curled tongue 31, the margins of which are defined by legs 32. The curl of the tongue 31 becomes tighter toward the tip 33 of the tongue 31 and is virtually straight near the sholders 26.

The capacitor clamp 20 is so proportioned that the uncinate shoulders are normally spaced slightly farther from each other than the distance between the intersections of the circumferential rib 11 and the radial ribs 12.

Figure 2:
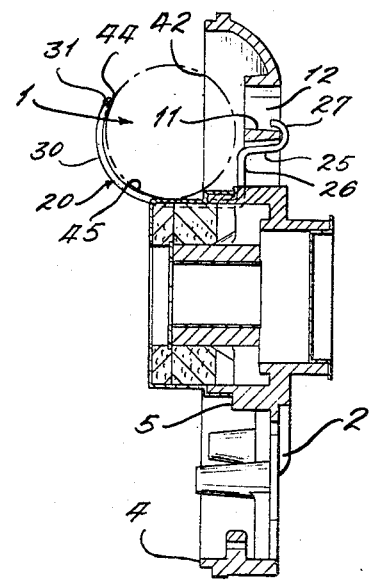
FIGURE 2 is a sectional view taken along the line 2—2 of FIGURE 1.
Figure 3:
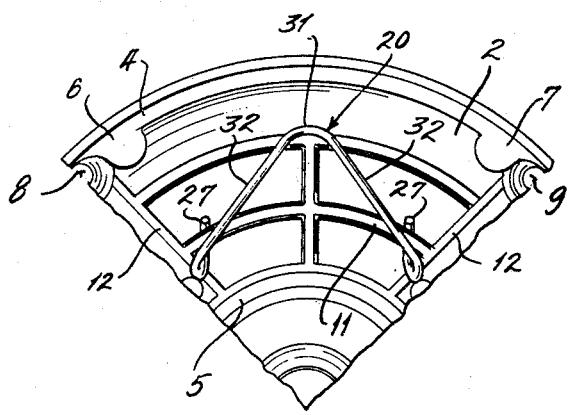
FIGURE 3 is a detail of the view shown in FIGURE 1, without the capacitor.
Figure 4:
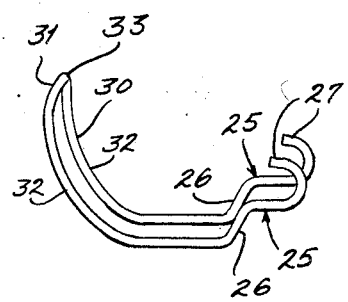
FIGURE 4 is a view in perspective of the clamp shown in FIGURE 1.
Figure 5:
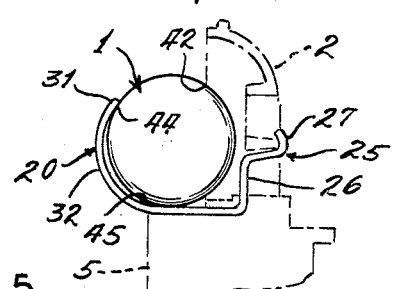
FIGURE 5 is a fragmentary sectional view taken along the line 5—5 of FIGURE 1, with the end shield shown in phantom lines.

In mounting a capacitor on the inside face of the end shield, the uncinate end sections 25 of the clamp 20 are compressed toward each other and the hooked ends 27 are slipped through a slot 14 radially inboard of the circumferential rib 11. The hooked ends 27 are slipped around the circumferential rib 11 and the end sections 25 are released. The capacitor 1 is then pushed between the tip 33 of the tongue 31 and the rim 4 of the end shield 2, until the widest point of the cylindrical casing 3 has been pushed between the tip 33 and the rim 4, whereupon the capacitor snaps into position, as shown in FIGURES 1, 2 and 5. In its mounted position, the cylindrical casing 3 abuts the rim 4 at two points 41 and 42, the tip 33 of the tongue 31 at one point 44, and each of the legs 32 at one point 45. The tension of the clamp 20 and the resulting friction at the bearing points prevent any movement of the capacitor under normal conditions. Significant circumferential movement of the capacitor is also restricted by the lugs 6 and 7. The capacitor may be removed by a sharp pull in the direction opposite that by which it was inserted.

When held in its operational position by this illustrative embodiment of clamp, the capacitor lies against the inside flat face of the end shield 2, and the tongue 31 extends axially inward less than one eighth inch beyond the inner edge of the capacitor case 3. Therefore, the assembly occupies less than one eighth inch more axial space in the motor than the diameter of the capacitor.

Merely by way of illustration, the clamp can be made of 19-gauge round spring wire, which is the same as .041" diameter music wire.

Numerous variations in the construction of the capacitor clamp of this invention, within the scope of the appended claims, will occur to those skilled in the art in the light of the foregoing disclosure. For example, different end sections may be provided to accommodate different end shield configurations. For instance, straight ends could be provided and pushed into tubular clips in the end shield of a totally enclosed motor. The central span section may be of somewhat different configurations. The clamp may be turned over, so that the tongue faces radially inward rather than radially outward, and the capacitor held primarily against the rotor bearing housing instead of primarily against the end shield rim. Serrations may be added to the clamp to give additional protection against rotation of the capacitor. These variations are merely illustrative.

Having thus described the invention, what is claimed and desired to be secured by Letters Patent is:

1. In a capacitor start motor having an end shield and a capacitor having a casing, the improvement comprising a clamp formed of stiffly flexible wire stock, said clamp having two end sections engaging said end shield, and a central span section adapted to engage said casing and to urge said casing into engagement with an inner wall of said end shield, said central span comprising a flatly curled tongue, a tip of said tongue engaging said casing.

2. The improvement of claim 1 wherein the tongue also engages the casing at two points axially outboard of said tip.

3. The improvement of claim 1 wherein the end sections comprise uncinate shoulders adapted to engage a rib of said end shield.

4. The improvement of claim 1 wherein the central span section is adapted to cradle said casing radially inboard of said casing, and said inner wall comprises a rim on said end shield.

References Cited

UNITED STATES PATENTS

| | | | |
|---|---|---|---|
| 2,868,386 | 1/1959 | Seyforth. | |
| 3,014,597 | 12/1961 | McWherter. | |
| 3,253,167 | 5/1966 | Bates | 310—68 |
| 3,267,312 | 8/1966 | Redick | 310—68 |
| 3,395,298 | 7/1968 | Shifley | 310—71 |

MILTON O. HIRSHFIELD, Primary Examiner

R. SKUDY, Assistant Examiner

U.S. Cl. X.R.

310—85